(12) United States Patent
Hatada et al.

(10) Patent No.: US 10,576,576 B2
(45) Date of Patent: Mar. 3, 2020

(54) SPOT WELDING SYSTEM

(71) Applicant: FANUC CORPORATION, Yamanashi (JP)

(72) Inventors: Masanobu Hatada, Yamanashi (JP); Yasuhiro Amagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/124,900

(22) Filed: Sep. 7, 2018

(65) Prior Publication Data

US 2019/0105729 A1 Apr. 11, 2019

(30) Foreign Application Priority Data

Oct. 6, 2017 (JP) .................................. 2017-195851

(51) Int. Cl.
 *B23K 11/25* (2006.01)
 *B23K 11/11* (2006.01)
 *B23K 11/31* (2006.01)

(52) U.S. Cl.
 CPC ............ *B23K 11/255* (2013.01); *B23K 11/11* (2013.01); *B23K 11/314* (2013.01)

(58) Field of Classification Search
 CPC ...... B23K 11/255; B23K 11/11; B23K 11/314
 USPC ......... 219/80, 83, 86.1, 86.33, 86.41, 86.51, 219/86.7, 91.1, 91.2, 110, 119
 See application file for complete search history.

(56) References Cited

U.S. PATENT DOCUMENTS

| | | | | | |
|---|---|---|---|---|---|
| 3,400,242 | A | * | 9/1968 | Waller | B23K 11/10 219/110 |
| 3,585,347 | A | * | 6/1971 | Needham | B23K 11/253 219/110 |
| 3,609,285 | A | * | 9/1971 | Scarpelli | B23K 11/25 219/109 |
| 4,028,522 | A | * | 6/1977 | Chihoski | B23K 11/253 219/109 |
| 4,296,304 | A | * | 10/1981 | Defourny | B23K 11/253 219/86.41 |
| 4,317,980 | A | * | 3/1982 | Goodrich | G04G 15/006 219/108 |
| 4,419,560 | A | * | 12/1983 | Zurek | B23K 11/252 219/110 |

(Continued)

FOREIGN PATENT DOCUMENTS

| | | |
|---|---|---|
| JP | 6-23561 | 2/1994 |
| JP | 11-320116 | 11/1999 |

(Continued)

*Primary Examiner* — Jimmy Chou
(74) *Attorney, Agent, or Firm* — Wenderoth, Lind & Ponack, L.L.P.

(57) ABSTRACT

To provide a spot welding system capable of shortening a cycle time of spot welding. A robot controller measures a time between a transmission time of a welding command signal to a welding machine and a reception time of a welding completion signal, after determining completion of pressuring by a spot welding robot, and subtracts a predetermined welding time from the measured time, thereby calculating a communication delay time between the robot controller and the welding machine. A spot welding system advances transmission timing of the welding command signal and the welding completion signal by the calculated communication delay time.

8 Claims, 12 Drawing Sheets

(56) References Cited

U.S. PATENT DOCUMENTS

| | | | | |
|---|---|---|---|---|
| 4,441,006 A * | 4/1984 | Machida | B23K 1/0004 | 219/110 |
| 4,447,700 A * | 5/1984 | Cohen | B23K 11/252 | 219/110 |
| 4,461,944 A * | 7/1984 | Cohen | G06F 3/05 | 219/110 |
| 4,503,312 A * | 3/1985 | Nakata | B23K 11/255 | 219/110 |
| 4,542,277 A * | 9/1985 | Cecil | B23K 11/253 | 219/109 |
| 4,596,917 A * | 6/1986 | Nied | B23K 11/3009 | 219/109 |
| 4,684,778 A * | 8/1987 | Cecil | B23K 11/317 | 219/116 |
| 4,694,135 A * | 9/1987 | Nagel | B23K 11/256 | 219/109 |
| 4,734,555 A * | 3/1988 | Ferguson | B23K 11/253 | 219/109 |
| 4,841,113 A * | 6/1989 | Hamada | B23K 11/115 | 219/110 |
| 4,861,960 A * | 8/1989 | Haefner | G05B 19/4163 | 219/110 |
| 4,963,707 A * | 10/1990 | Zyokou | B23K 11/256 | 219/110 |
| 4,970,361 A * | 11/1990 | Fuse | B23K 11/314 | 219/110 |
| 4,984,171 A * | 1/1991 | Tsujii | B23K 11/253 | 219/86.41 |
| 5,083,003 A * | 1/1992 | Clark, Jr. | B23K 11/25 | 219/110 |
| 5,194,709 A * | 3/1993 | Ichikawa | B23K 11/253 | 219/109 |
| 5,276,308 A * | 1/1994 | Hasegawa | B23K 11/256 | 219/110 |
| 5,321,225 A * | 6/1994 | Boyer | B23K 11/31 | 219/89 |
| 5,343,011 A * | 8/1994 | Fujii | B23K 11/257 | 219/109 |
| 5,376,766 A * | 12/1994 | Higgins | B23K 13/025 | 219/109 |
| 5,393,950 A * | 2/1995 | Killian | B23K 11/253 | 219/110 |
| 5,406,045 A * | 4/1995 | Kiriishi | B23K 11/257 | 219/110 |
| 5,436,422 A * | 7/1995 | Nishiwaki | B23K 11/256 | 219/110 |
| 5,440,092 A * | 8/1995 | Kawai | B23K 11/256 | 219/110 |
| 5,483,035 A * | 1/1996 | Kawai | B23K 11/253 | 219/110 |
| 5,575,934 A * | 11/1996 | Takakuwa | B23K 11/257 | 219/109 |
| 5,764,859 A * | 6/1998 | Kim | B23K 11/252 | 219/109 |
| 5,831,235 A * | 11/1998 | Cecil | B23K 11/0046 | 219/110 |
| 5,852,273 A * | 12/1998 | Ryudo | B23K 11/252 | 219/110 |
| 5,883,355 A * | 3/1999 | Kaneshima | B23K 11/255 | 219/86.51 |
| 5,892,197 A * | 4/1999 | Goto | B23K 11/256 | 219/110 |
| 5,906,755 A * | 5/1999 | Arasuna | B23K 11/311 | 219/86.41 |
| 6,043,449 A * | 3/2000 | Kanjo | B23K 11/25 | 219/109 |
| 6,057,523 A * | 5/2000 | Fujii | B23K 11/257 | 219/110 |
| 6,064,029 A * | 5/2000 | Choi | B23K 11/10 | 219/110 |
| 6,084,195 A * | 7/2000 | Swaggerty | B23K 11/252 | 219/109 |
| 6,118,095 A * | 9/2000 | Nagano | B23K 11/253 | 219/109 |
| 6,156,992 A * | 12/2000 | Besslein | B23K 11/115 | 219/109 |
| 6,232,572 B1 * | 5/2001 | Kanjo | B23K 11/115 | 219/110 |
| 6,278,077 B1 * | 8/2001 | Cecil | B23K 11/115 | 219/86.41 |
| 6,294,753 B1 * | 9/2001 | Fujii | B23K 11/252 | 219/110 |
| 6,414,259 B2 * | 7/2002 | Kanjo | B23K 11/253 | 219/109 |
| 6,506,997 B2 * | 1/2003 | Matsuyama | B23K 11/252 | 219/109 |
| 6,515,251 B1 * | 2/2003 | Wind | B23K 11/255 | 219/110 |
| 6,903,298 B2 * | 6/2005 | Wang | B23K 11/11 | 219/110 |
| 7,127,438 B2 * | 10/2006 | Monari | G05B 13/027 | 706/21 |
| 7,214,902 B2 * | 5/2007 | Vanderzwet | B23K 11/314 | 219/89 |
| 7,223,933 B2 * | 5/2007 | Vanderzwet | B23K 11/115 | 219/89 |
| 7,655,880 B2 * | 2/2010 | Auger | B23K 11/255 | 219/110 |
| 7,956,308 B2 * | 6/2011 | Augustine | B23K 11/315 | 219/86.25 |
| 8,053,698 B2 * | 11/2011 | Wang | B23K 11/25 | 219/117.1 |
| 8,302,479 B2 * | 11/2012 | Shibata | B23K 11/115 | 73/597 |
| 8,357,870 B1 * | 1/2013 | Edwards, II | B23K 11/251 | 219/78.01 |
| 8,415,582 B2 * | 4/2013 | Wang | B23K 11/3063 | 219/107 |
| 8,426,761 B2 * | 4/2013 | Takahashi | B23K 11/115 | 219/110 |
| 8,450,634 B2 * | 5/2013 | Numano | B23K 11/115 | 219/108 |
| 8,525,077 B2 * | 9/2013 | Peters | B23K 9/32 | 219/130.01 |
| 8,710,394 B2 * | 4/2014 | Wang | B23K 11/115 | 219/108 |
| 9,073,146 B2 * | 7/2015 | Sakai | B23K 11/255 | |
| 9,144,860 B2 * | 9/2015 | Garza | B23K 11/115 | |
| 9,266,182 B2 * | 2/2016 | Hung | B23K 9/32 | |
| 9,266,187 B2 * | 2/2016 | Cohen | B23K 11/253 | |
| 9,555,498 B2 * | 1/2017 | Hirsch | B23K 11/115 | |
| 9,610,649 B2 * | 4/2017 | Lee | B23K 11/11 | |
| 9,875,665 B2 * | 1/2018 | Beeson | B23K 9/0956 | |
| 9,889,520 B2 * | 2/2018 | Ennsbrunner | B23K 11/115 | |
| 9,895,764 B2 * | 2/2018 | Okita | B23K 11/115 | |
| 10,071,436 B2 * | 9/2018 | Hou | B23K 11/115 | |
| 10,141,106 B2 * | 11/2018 | Artelsmair | B23K 11/241 | |
| 10,210,773 B2 * | 2/2019 | Becker | G09B 19/24 | |
| 10,293,429 B2 * | 5/2019 | Amagata | B23K 11/25 | |
| 10,373,517 B2 * | 8/2019 | Becker | G09B 19/003 | |
| 10,399,174 B2 * | 9/2019 | Morita | B23K 11/16 | |
| 10,408,875 B2 * | 9/2019 | Chang | G01R 31/2853 | |
| 10,417,934 B2 * | 9/2019 | Becker | B23K 9/322 | |
| 2002/0125219 A1 * | 9/2002 | Janssens | B23K 11/31 | 219/86.41 |
| 2004/0074877 A1 * | 4/2004 | Hochhalter | B23K 11/253 | 219/86.41 |
| 2004/0245315 A1 * | 12/2004 | Maev | G01N 29/262 | 228/8 |
| 2007/0228018 A1 * | 10/2007 | Murai | B23K 11/314 | 219/86.25 |
| 2010/0243616 A1 * | 9/2010 | Goto | B23K 11/0026 | 219/117.1 |
| 2011/0114611 A1 * | 5/2011 | Cole | B23K 9/1006 | 219/130.1 |
| 2011/0180518 A1 * | 7/2011 | Hasegawa | B23K 11/115 | 219/108 |

(56) References Cited

U.S. PATENT DOCUMENTS

| | | | | |
|---|---|---|---|---|
| 2011/0233174 A1* | 9/2011 | Shibata | ............... | B23K 11/115 |
| | | | | 219/91.2 |
| 2012/0055910 A1* | 3/2012 | Sakai | ............... | B23K 11/115 |
| | | | | 219/127 |
| 2012/0150797 A1* | 6/2012 | Landy | ............... | G06F 16/254 |
| | | | | 707/610 |
| 2013/0153544 A1* | 6/2013 | Goto | ............... | B23K 11/115 |
| | | | | 219/117.1 |
| 2013/0180961 A1* | 7/2013 | Goto | ............... | B23K 11/115 |
| | | | | 219/86.33 |
| 2015/0209891 A1* | 7/2015 | Aoki | ............... | B23K 11/115 |
| | | | | 348/90 |
| 2018/0056434 A1* | 3/2018 | Aoki | ............... | B23K 11/185 |

FOREIGN PATENT DOCUMENTS

| | | |
|---|---|---|
| JP | 2006-227717 | 8/2006 |
| JP | 2014-198373 | 10/2014 |

* cited by examiner

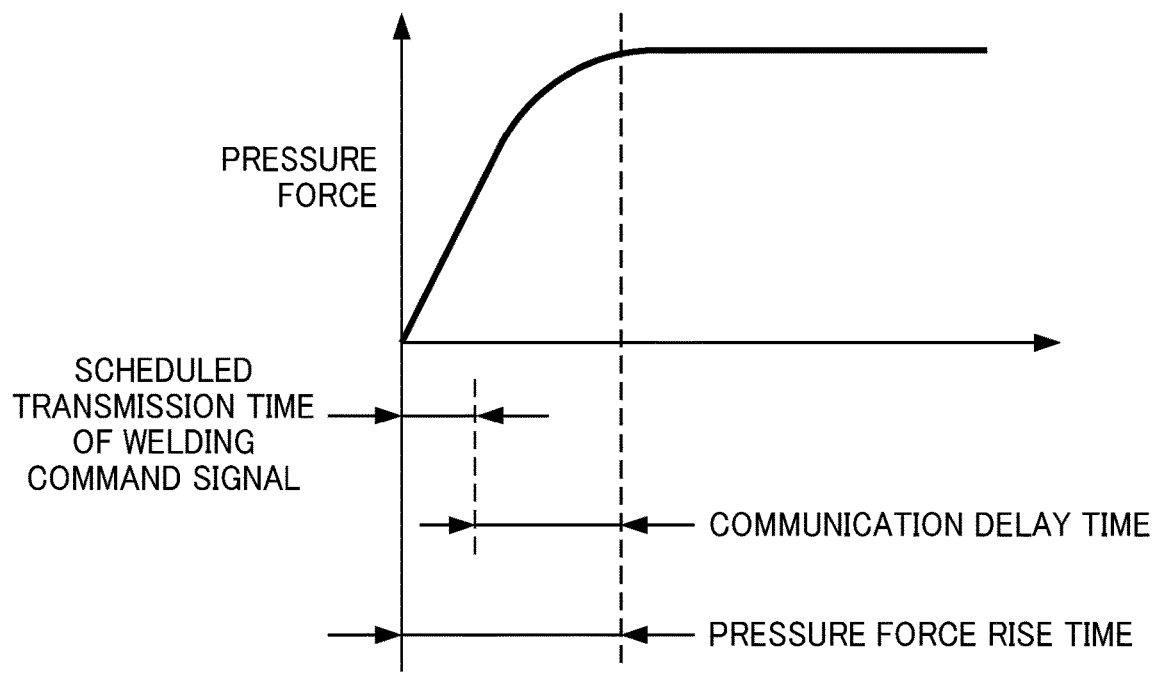
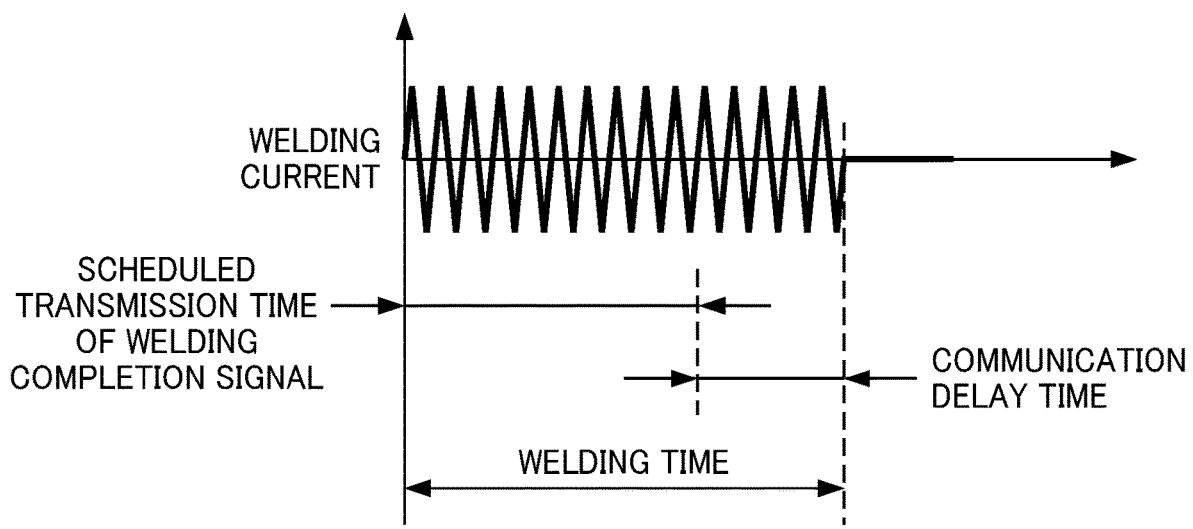

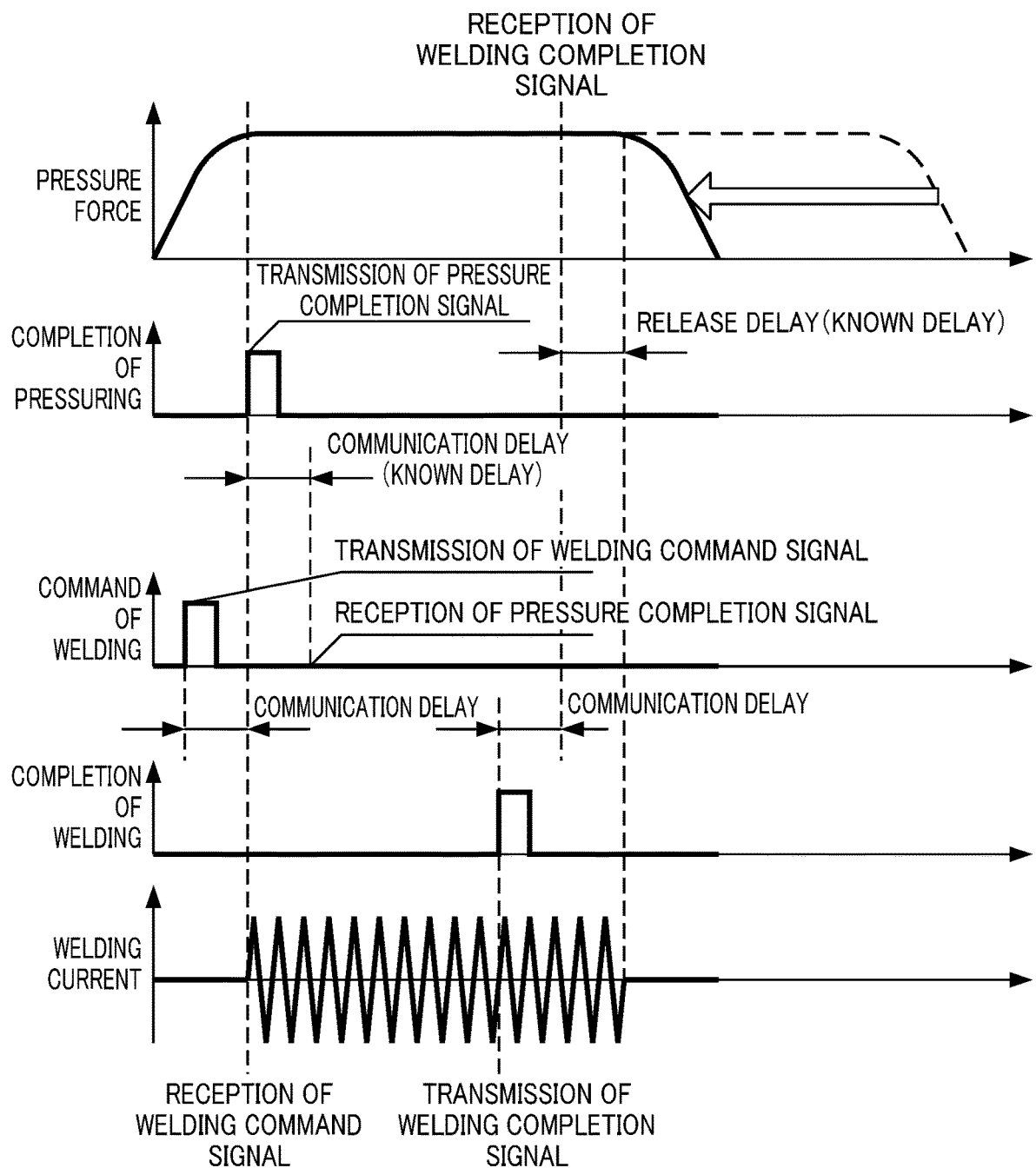

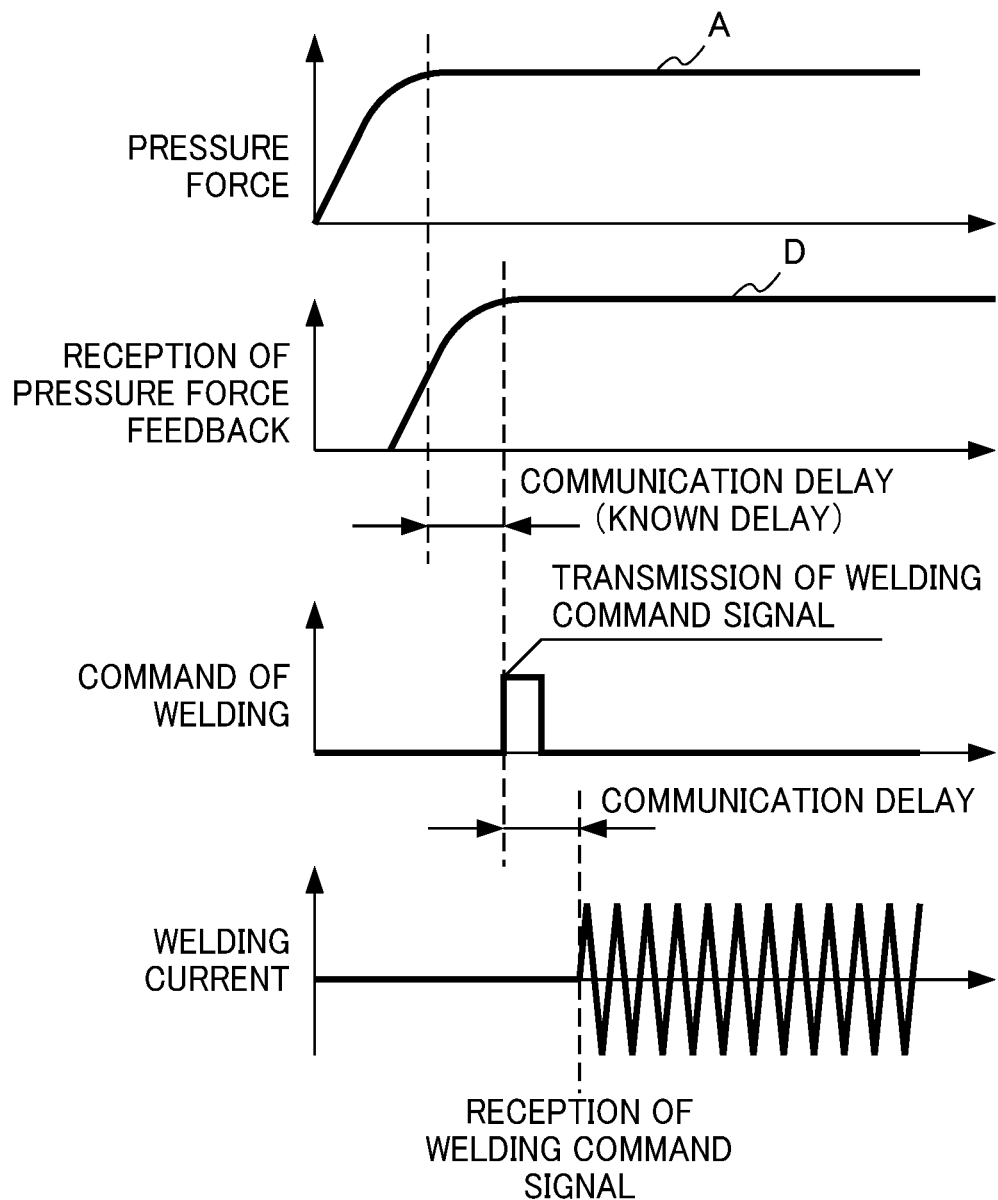

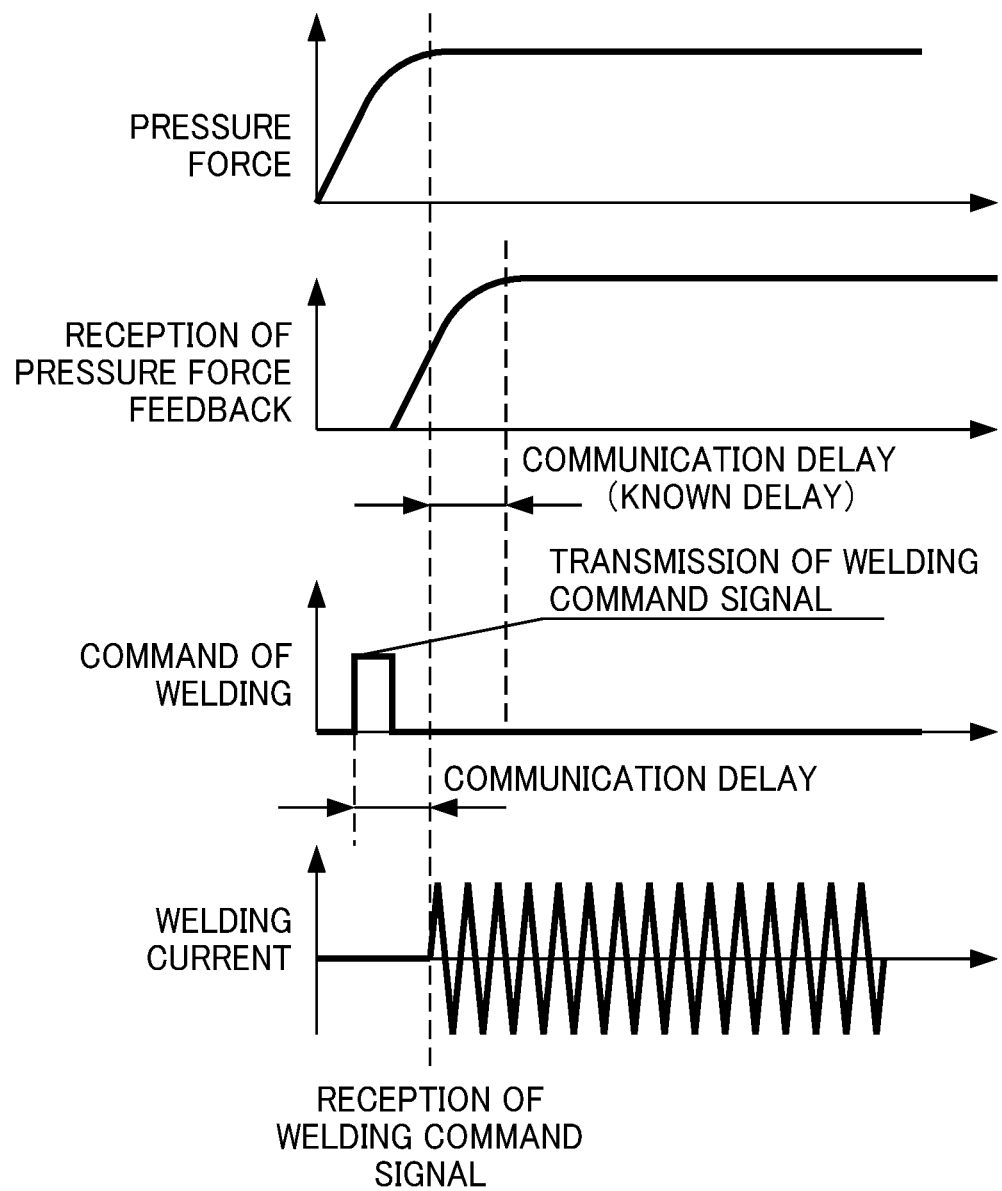

SPOT WELDING SYSTEM

This application is based on and claims the benefit of priority from Japanese Patent Application No. 2017-195851, filed on 6 Oct. 2017, the content of which is incorporated herein by reference.

BACKGROUND OF THE INVENTION

Field of the Invention

The present invention relates to a system for spot welding performed by a robot.

Related Art

Conventionally, robot systems for performing spot welding are operated at various places, for example, a vehicle body assembly process at an automotive factory. In such a robot system, when a robot reaches a welding position, a pressure command is issued to a welding gun, and when a pressure force feedback reaches a preset pressure force, a welding command is issued to a welding machine. The welding machine starts to perform welding upon reception of the welding command, and terminates the welding and notifies the robot of the completion of the welding after a welding time set as a welding condition elapses. The robot maintains a pressure force during the welding, and releases the welding gun and moves to the next welding position upon reception of notification of the completion of the welding. The series of such operation includes a required pressuring time from when pressuring is commanded to when the pressuring is completed, as an example, and the time corresponds to a standby time of the welding machine, which affects a cycle time of welding. To deal with this, for example, a method of controlling the timing of the pressure command in consideration of the required pressuring time taken the welding gun (for example, refer to Patent Document 1 and Patent Document 2) is proposed.

Patent Document 1: Japanese Unexamined Patent Application, Publication No. H06-023561

Patent Document 2: Japanese Unexamined Patent Application, Publication No. H11-320116

SUMMARY OF THE INVENTION

However, such factors affecting the cycle time are not limited to the operation time of a robot. Since the constituent elements of the system, such as a robot and a welding machine, are connected via communication lines, communication delay of various command signals may occur. When delay is generated in transmission of a welding command from the robot to the welding machine or in transmission of a welding completion notification from the welding machine to the robot, the pressure time is prolonged compared to the welding time, whereby the cycle time is prolonged.

The object of the present invention is to provide a spot welding system capable of shortening the cycle time of spot welding.

(1) A spot welding system according to the present invention (for example, a "spot welding system 1" described below) includes a spot welding robot (for example, a "spot welding robot 10" described below), a robot controller (for example, a "robot controller 20" described below), and a welding machine (for example, a "welding machine 30" described below). The spot welding robot includes a pressure control unit (for example, a "pressure control unit 12" described below) for applying pressure to a welding gun (for example, a "welding gun 11" described below) upon reception of a pressure command signal from the robot controller, and releasing the welding gun upon reception of a pressure release signal; and a pressure completion signal transmission unit (for example, a "pressure completion signal transmission unit 13" described below) for transmitting a pressure completion signal to the robot controller upon reaching of a pressure force to a predetermined value. The robot controller includes a pressure command signal transmission unit (for example, a "pressure command signal transmission unit 21" described below) for transmitting the pressure command signal to the spot welding robot; a welding command signal transmission unit (for example, a "welding command signal transmission unit 22" described below) for transmitting a welding command signal for making the welding machine perform welding for a predetermined welding time upon reception of the pressure completion signal from the spot welding robot; a pressure release signal transmission unit (for example, a "pressure release signal transmission unit 23" described below) for transmitting the pressure release signal to the spot welding robot upon reception of a welding completion signal from the welding machine; and a communication delay calculation unit (for example, a "communication delay calculation unit 24" described below) for calculating a half of a time obtained by subtracting the welding time from a differential time between the transmitting of the welding command signal and the reception of the welding completion signal, as a communication delay time between the robot controller and the welding machine. The welding machine includes a welding execution unit (for example, a "welding execution unit 31" described below) for starting the welding by supplying a welding current upon reception of the welding command signal from the robot controller; and a welding completion signal transmission unit (for example, a "welding completion signal transmission unit 32" described below) for transmitting the welding completion signal to the robot controller upon completion of the welding for the welding time. In the case where the communication delay time is calculated, the welding command signal transmission unit transmits the welding command signal when a time obtained by subtracting the communication delay time from a pressure force rise time corresponding to the pressure command signal elapses after the transmitting of the pressure command signal, and the welding completion signal transmission unit transmits the welding completion signal when a time obtained by subtracting the communication delay time from the welding time elapses after the starting of the welding.

(2) The spot welding system according to the present invention (for example, a "spot welding system 1" described below) includes a spot welding robot (for example, a "spot welding robot 10" described below), a robot controller (for example, a "robot controller 20" described below), and a welding machine (for example, a "welding machine 30" described below). The spot welding robot includes a pressure control unit (for example, a "pressure control unit 12" described below) for applying pressure to a welding gun (for example, a "welding gun 11" described below) upon reception of a pressure command signal from the robot controller, and releasing the welding gun upon reception of a pressure release signal; and a pressure force feedback unit (for example, a "pressure force feedback unit 14" described below) for measuring a pressure force and notifying the robot controller of the pressure force. The robot controller includes a pressure command signal transmission unit (for example, a "pressure command signal transmission unit 21" described below) for transmitting the pressure command signal to the spot welding robot; a welding command signal transmission unit (for example, a "welding command signal transmission unit 22" described below) for transmitting a welding command signal for making the welding machine perform welding for a predetermined welding time upon reaching of the pressure force to a predetermined value, the pressure force being notified of by the spot welding robot; a pressure release signal transmission unit (for example, a "pressure release signal transmission unit 23" described below) for transmitting the pressure release signal to the spot welding robot upon reception of a welding completion signal from the welding machine; and a communication delay calculation unit (for example, a "communication delay calculation unit 24" described below) for calculating a half of a time obtained by subtracting the welding time from a differential time between the transmitting of the welding command signal and the reception of the welding completion signal, as a communication delay time between the robot controller and the welding machine. The welding machine includes a welding execution unit (for example, a "welding execution unit 31" described below) for starting the welding by supplying a welding current upon reception of the welding command signal from the robot controller; and a welding completion signal transmission unit (for example, a "welding completion signal transmission unit 32" described below) for transmitting the welding completion signal to the robot controller upon completion of the welding for the welding time. In the case where the communication delay time is calculated, the welding command signal transmission unit transmits the welding command signal when a time obtained by subtracting the communication delay time from a pressure force rise time corresponding to the pressure command signal elapses after the transmitting of the pressure command signal, and the welding completion signal transmission unit transmits the welding completion signal when a time obtained by subtracting the communication delay time from the welding time elapses after the starting of the welding.

(3) In the spot welding system according to (1) or (2), the welding command signal transmission unit may further advance transmission timing of the welding command signal by a known delay time in communication between the spot welding robot and the robot controller.

(4) In the spot welding system according to any one of (1) to (3), the welding completion signal transmission unit may further advance transmission timing of the welding completion signal by a known delay time in a releasing operation of the welding gun.

(5) In the spot welding system according to any one of (1) to (4), the robot controller may share the communication delay time calculated by the communication delay calculation unit with another spot welding system.

The present invention enables to shorten a cycle time of spot welding.

BRIEF DESCRIPTION OF THE DRAWINGS

FIG. 6 is a diagram illustrating a method of calculating a scheduled transmission time of a welding command signal according to the first embodiment.

FIG. 7 is a diagram illustrating a method of calculating a scheduled transmission time of a welding completion signal according to the first embodiment.

FIG. 11 is a diagram illustrating a method of shortening a cycle time according to the third embodiment.

FIG. 12 is a diagram illustrating signal transmission and reception timing before the start of welding according to a fourth embodiment.

FIG. 13 is a diagram illustrating signal transmission and reception timing before the start of welding, in the case where a cycle time is shortened according to the fourth embodiment.

DETAILED DESCRIPTION OF THE INVENTION

[First Embodiment]

Figure 1:
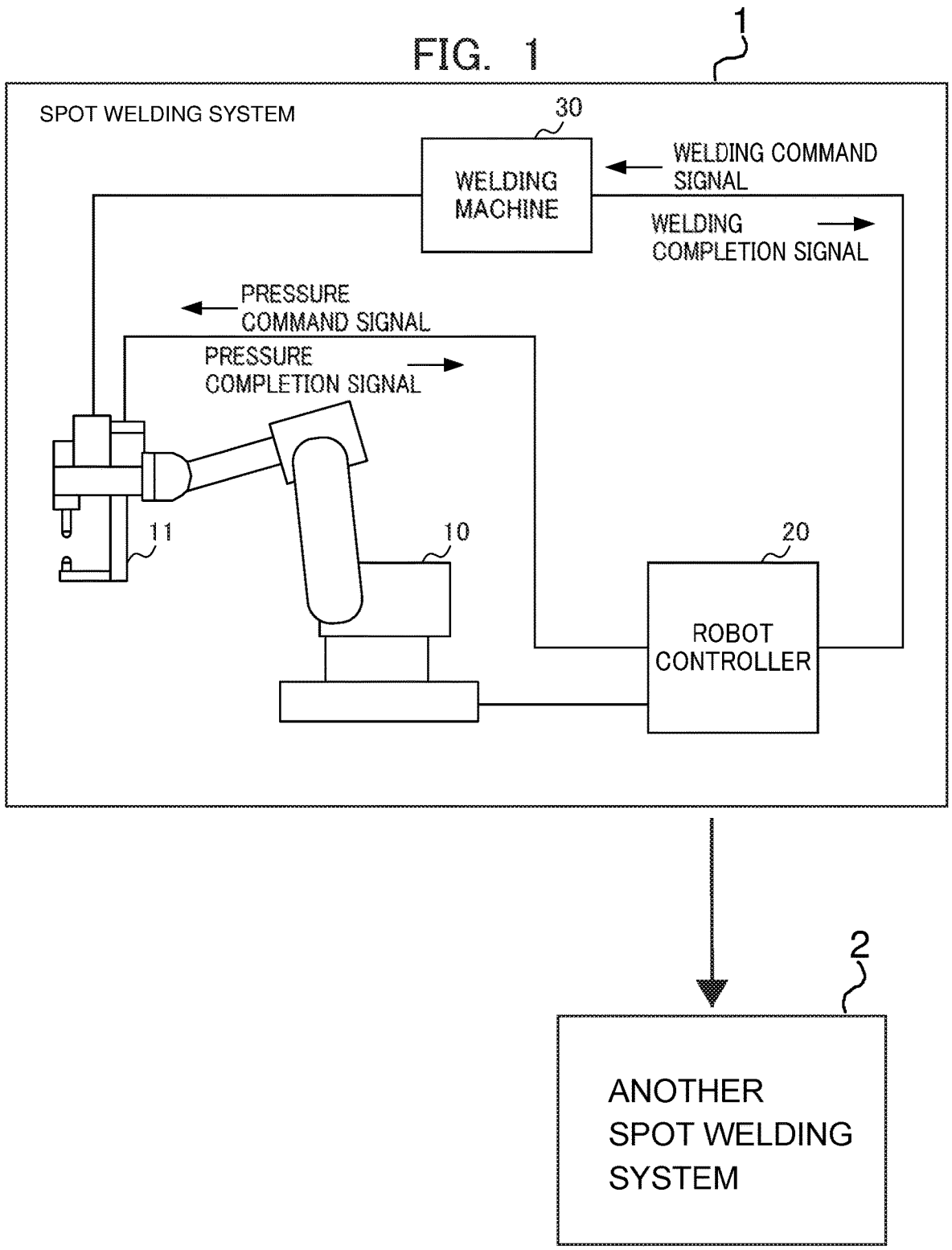
FIG. 1 is a diagram illustrating a configuration of a spot welding system according to a first embodiment.

The first embodiment of the present invention is described below. FIG. 1 is a diagram illustrating a configuration of a spot welding system 1 according to the present embodiment. The spot welding system 1 includes a spot welding robot 10, a robot controller 20, and a welding machine 30.

The spot welding robot 10 is a robot for performing spot welding frequently used as means for joining components. The spot welding robot 10 performs pressuring with a welding gun 11 at a joining point (spot) positioned according to the control by the robot controller 20, and performs the spot welding by the welding current supplier by the welding machine 30.

The robot controller 20 is an information processing device for controlling the spot welding robot 10 and the welding machine 30 on the basis of predetermined software and user input via an operator's panel. Various signals such as of commands and notifications are transmitted and received via dedicated communication paths between the robot controller 20 and the spot welding robot 10 and between the robot controller 20 and the welding machine 30.

The welding machine 30 controls the output and termination of the welding current to the welding gun 11 of the spot welding robot 10, on the basis of the control signal from the robot controller 20 and the user input via the operator's panel.

In the present embodiment, a pressure command signal is transmitted from the robot controller 20 to the spot welding robot 10, and a pressure completion signal is transmitted from the spot welding robot 10 to the robot controller 20. A welding command signal is transmitted from the robot controller 20 to the welding machine 30, and a welding completion signal is transmitted from the welding machine 30 to the robot controller 20.

Figure 2:
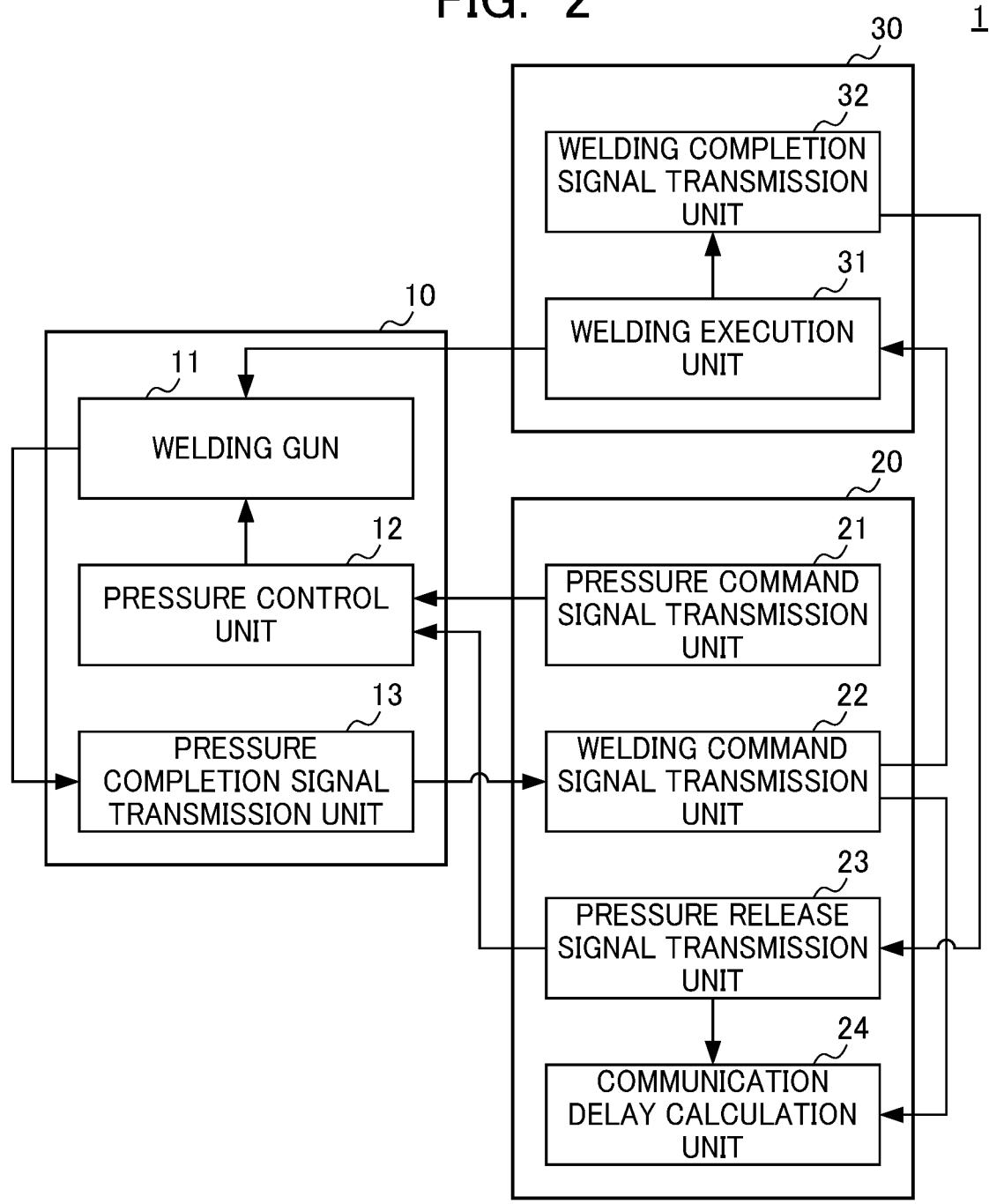
FIG. 2 is a diagram illustrating a functional configuration of the respective devices included in the spot welding system according to the first embodiment.

FIG. 2 is a diagram illustrating a functional configuration of the respective devices included in the spot welding system 1 according to the present embodiment. The spot welding robot 10 includes the welding gun 11, a pressure control unit 12, and a pressure completion signal transmission unit 13. The robot controller 20 includes a pressure command signal transmission unit 21, a welding command signal transmission unit 22, a pressure release signal transmission unit 23, and a communication delay calculation unit 24. The welding machine 30 includes a welding execution unit 31 and a welding completion signal transmission unit 32.

The pressure control unit 12 applies pressure to the welding gun 11 upon reception of the pressure command signal from the robot controller 20, and releases the welding gun 11 upon reception of a pressure release signal. When the pressure force of the welding gun 11 reaches a predetermined value, the pressure completion signal transmission unit 13 transmits the pressure completion signal to the robot controller 20.

The pressure command signal transmission unit 21 transmits the pressure command signal to the spot welding robot 10 having reached a spot. The welding command signal transmission unit 22 transmits the welding command signal for making the welding machine 30 perform welding for a predetermined welding time, upon reception of the pressure completion signal from the spot welding robot 10. The pressure release signal transmission unit 23 transmits the pressure release signal to the spot welding robot 10, upon reception of the welding completion signal from the welding machine 30.

The communication delay calculation unit 24 calculates a time which is half a time obtained by subtracting a predetermined welding time from an elapsed time from when the welding command signal is transmitted to the welding machine 30 to when the welding completion signal is received, as a communication delay time between the robot controller 20 and the welding machine 30.

Upon reception of the welding command signal from the robot controller 20, the welding execution unit 31 starts to perform welding by supplying the welding current to the welding gun 11 of the spot welding robot 10. Upon completion of the welding for a predetermined welding time, the welding completion signal transmission unit 32 transmits the welding completion signal to the robot controller 20.

In the case where the communication delay calculation unit 24 has already calculated the communication delay time, the welding command signal transmission unit 22 transmits the welding command signal when a time obtained by subtracting the communication delay time from a pressure force rise time corresponding to the pressure command signal elapses after the transmission of the pressure command signal. In the case where the communication delay time is notified of by the robot controller 20 or input by a user, the welding completion signal transmission unit 32 of the welding machine 30 transmits the welding completion signal when the time obtained by subtracting the communication delay time from the welding time elapses after the start of the welding.

Figure 3:
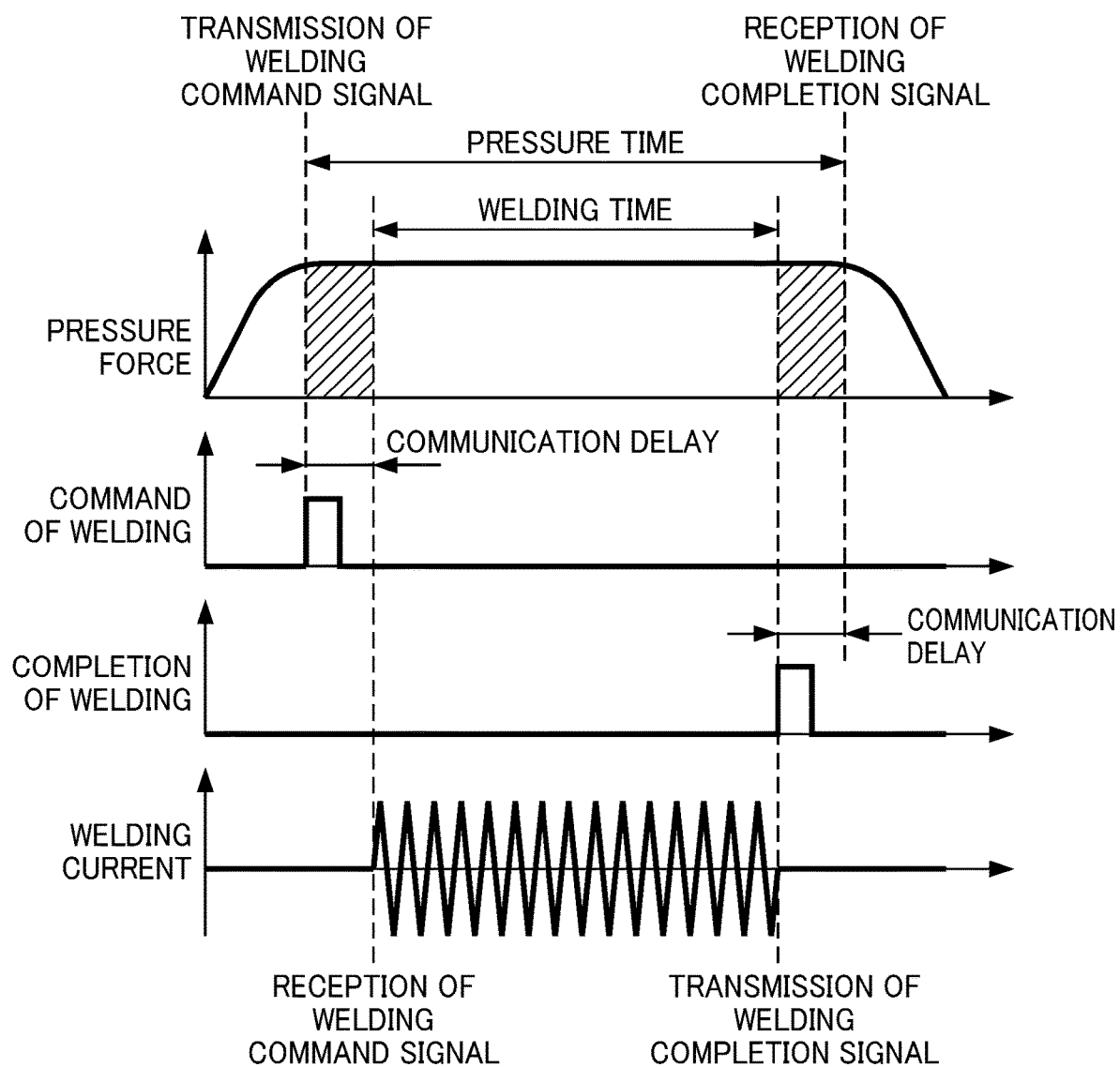
FIG. 3 is a diagram illustrating a pressure time, a welding time and a communication delay time in a spot welding process according to the first embodiment.

FIG. 3 is a diagram illustrating a pressure time, a welding time and a communication delay time in the spot welding process according to the present embodiment. The communication delay time is generated, between the time at which the pressure force rises and the welding command signal is transmitted by the robot controller 20 and the time at which the welding machine 30 receives the signal.

The welding machine 30 supplies the welding current upon the reception of the welding command signal, and transmits the welding completion signal to the robot controller 20 when the welding time elapses. Another communication delay time is generated before the welding completion signal is received by the robot controller 20.

As a result of these communication delays, the pressure time during which a predetermined pressure force is maintained is longer than the welding time by twice the "communication delay time." The hatched portions in the figure are unnecessary waiting times, and the cycle time of the spot welding is thus prolonged.

Figure 4:
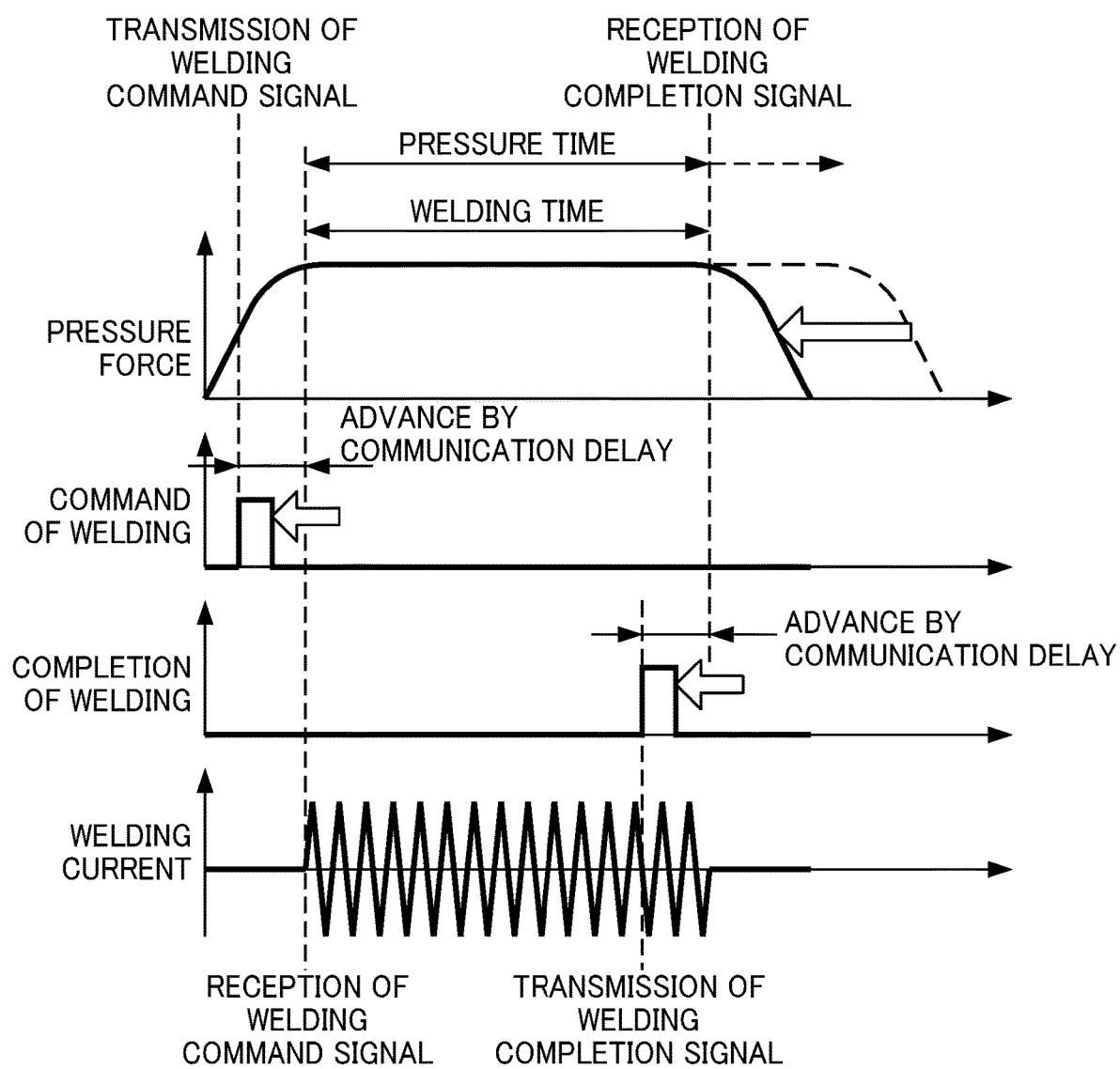
FIG. 4 is a diagram illustrating a method of shortening a cycle time according to the first embodiment.

FIG. 4 is a diagram illustrating a method of shortening the cycle time according to the present embodiment. According to the method of the present embodiment, the robot controller 20 calculates the communication delay time, and thereafter the transmission timing of the welding command signal and the welding completion signal are adjusted by using the calculated communication delay time.

Specifically, the welding command signal transmission unit 22 advances the transmission timing of the welding command signal ahead of the normal timing by the communication delay time. Accordingly, even when such communication delay occurs, the welding is started without delay after the command of the welding. The welding completion signal transmission unit 32 advances the transmission timing of the welding completion signal ahead of the normal timing by the communication delay time. Accordingly, even when such communication delay occurs, the pressure force of the welding gun 11 is released without delay after the completion of the welding. As a result, the pressure time becomes equivalent to the welding time, whereby the cycle time is shortened.

Figure 5:
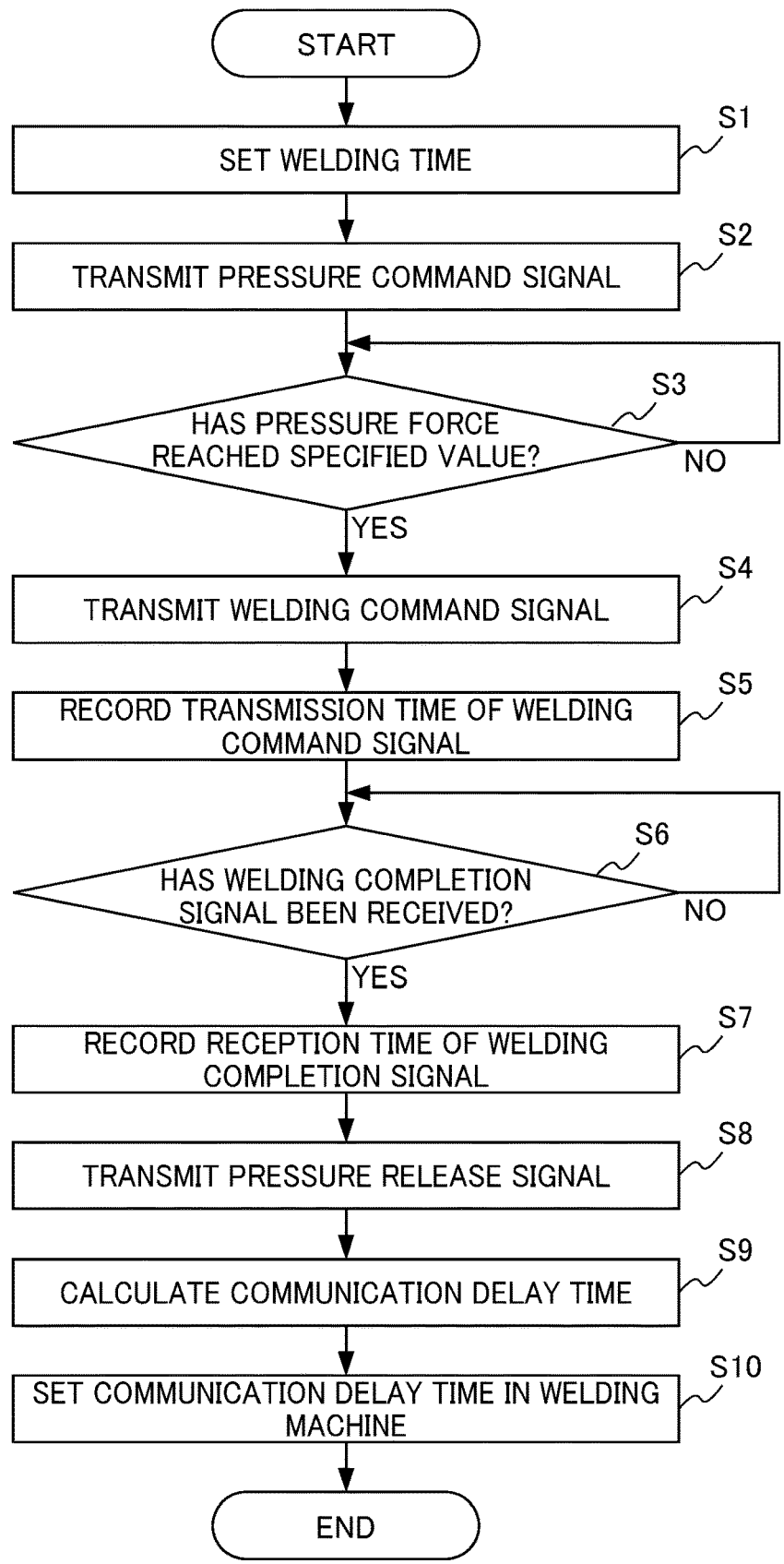
FIG. 5 is a flowchart indicating a method of calculating the communication delay time in a robot controller according to the first embodiment.

FIG. 5 is a flowchart indicating a method of calculating the communication delay time in the robot controller 20 according to the present embodiment. In step S1, the robot controller 20 sets the welding time, by notifying the welding machine 30 of the welding time. It is noted that a user may directly input the set value to the welding machine 30 via the operator's panel.

In step S2, the pressure command signal transmission unit 21 transmits the pressure command signal to the spot welding robot 10 to make the spot welding robot 10 start to perform pressuring in step S3, the welding command signal transmission unit 22 determines whether or not the pressure completion signal has been received from the spot welding robot 10, that is, whether or not the pressure force has reached a specified value. In the case where the determination is made as YES, the processing moves to step S4. In the case where the determination is made as NO, step S3 is repeated, and the robot controller 20 waits for the completion of the pressuring.

In step S4, the welding command signal transmission unit 22 transmits the welding command signal to the welding machine 30 to make the welding machine 30 start to perform welding. In step S5, the welding command signal transmission unit 22 records the time of transmitting the welding command signal.

In step S6, the pressure release signal transmission unit 23 determines whether or not the welding completion signal has been received from the welding machine 30, that is, whether or not the welding time has elapsed since the start of the welding. In the case where the determination is made as YES, the processing moves to step S7. In the case where the determination is made as NO, step S6 is repeated, and the robot controller 20 waits for the completion of the welding.

In step S7, the pressure release signal transmission unit 23 records the time of receiving the welding completion signal. In step S8, the pressure release signal transmission unit 23 transmits the pressure release signal to the spot welding robot 10 to release the welding gun 11.

In step S9, the communication delay calculation unit 24 performs the following calculation on the basis of the time at which the welding command signal is transmitted and the time at which the welding completion signal is received: communication delay time=((time at which the welding completion signal is received−time at which the welding command signal is transmitted)−welding time)/2. In step S10, the robot controller 20 sets the calculated communication delay time by notifying the welding machine 30 of the calculated communication delay time. It is noted that a user may directly input the set value to the welding machine 30 via the operator's panel.

The calculated communication delay time may be shared with another system 2 having the same configuration as that of the spot welding system 1. In an example, in an automotive vehicle body assembly process, spot welding is performed at more than 3000 spots, and each of a large number of robots is in charge of spot welding for several dozens of spots. The communication delay time generated similarly in the plurality of robot systems is calculated commonly, whereby the processing of individual calculations is omitted.

A method is described below of determining the transmission timing of the welding command signal and the welding completion signal, taking into consideration the communication delay time. The welding command signal transmission unit 22 calculates a scheduled transmission time from the start of the pressuring to the transmission of the welding command signal. The welding completion signal transmission unit 32 calculates a scheduled transmission time from the start of the welding to the transmission of the welding completion signal.

FIG. 6 is a diagram illustrating a method of calculating the scheduled transmission time of the welding command signal according to the present embodiment. The scheduled transmission time of the welding command signal is calculated as "pressure force rise time−communication delay time." The pressure force rise time is determined according to the magnitude of the pressure force specified by a machining program. The welding command signal transmission unit 22 thus calculates the scheduled transmission time by subtracting the communication delay time by use of a value according to the pressure force specified for each spot.

FIG. 7 is a diagram illustrating a method of calculating the scheduled transmission time of the welding completion signal according to the present embodiment. The scheduled transmission time of the welding completion signal is calculated as "welding time−communication delay time."

The welding time for the spot welding requires approx. 400 msec, and the rise of the pressure force takes, for example, 100 msec. On the other hand, approx. 20 msec is estimated for the communication delay time. Thus, approx. 40 msec in total for the communication delay of the welding command signal and the communication delay of the welding completion signal is shortened for each spot.

According to the present embodiment, the robot controller 20 measures the time between the transmission time of the welding command signal and the reception time of the welding completion signal after determining the completion of the pressuring, and subtracts a predetermined welding time from the measured time, thereby calculating the communication delay time between the robot controller 20 and the welding machine 30. The spot welding system 1 advances the subsequent transmission timing of the welding command signal and the welding completion signal by use of the calculated communication delay time, thereby enabling to shorten the cycle time of the spot welding.

The spot welding system 1 shares the calculated communication delay time with another system having the same configuration, thereby reducing the processing load for each system to independently calculate the delay time, resulting in improving the efficiency thereof.

[Second Embodiment]

The second embodiment of the present invention is described below. It is noted that the same reference numerals are given to the same configurations as those of the first embodiment, and the description thereof will be omitted or simplified.

Figure 8:
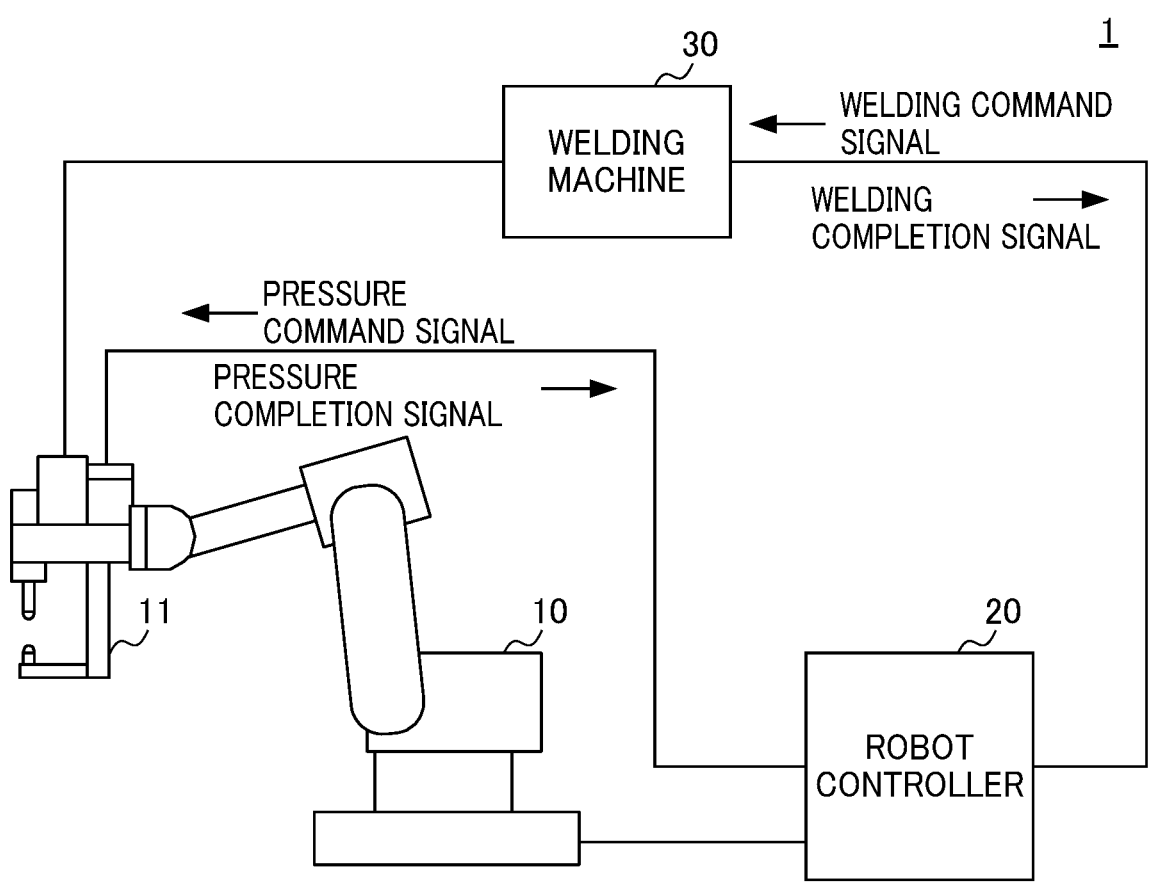
FIG. 8 is a diagram illustrating a configuration of a spot welding system according to a second embodiment.

FIG. 8 is a diagram illustrating the configuration of the spot welding system 1 according to the present embodiment. In the first embodiment, the spot welding robot 10 transmits the pressure completion signal to the robot controller 20 as information for the robot controller 20 to determine the completion of the pressuring. In the second embodiment, the spot welding robot 10 transmits a pressure force feedback signal to the robot controller 20.

Figure 9:
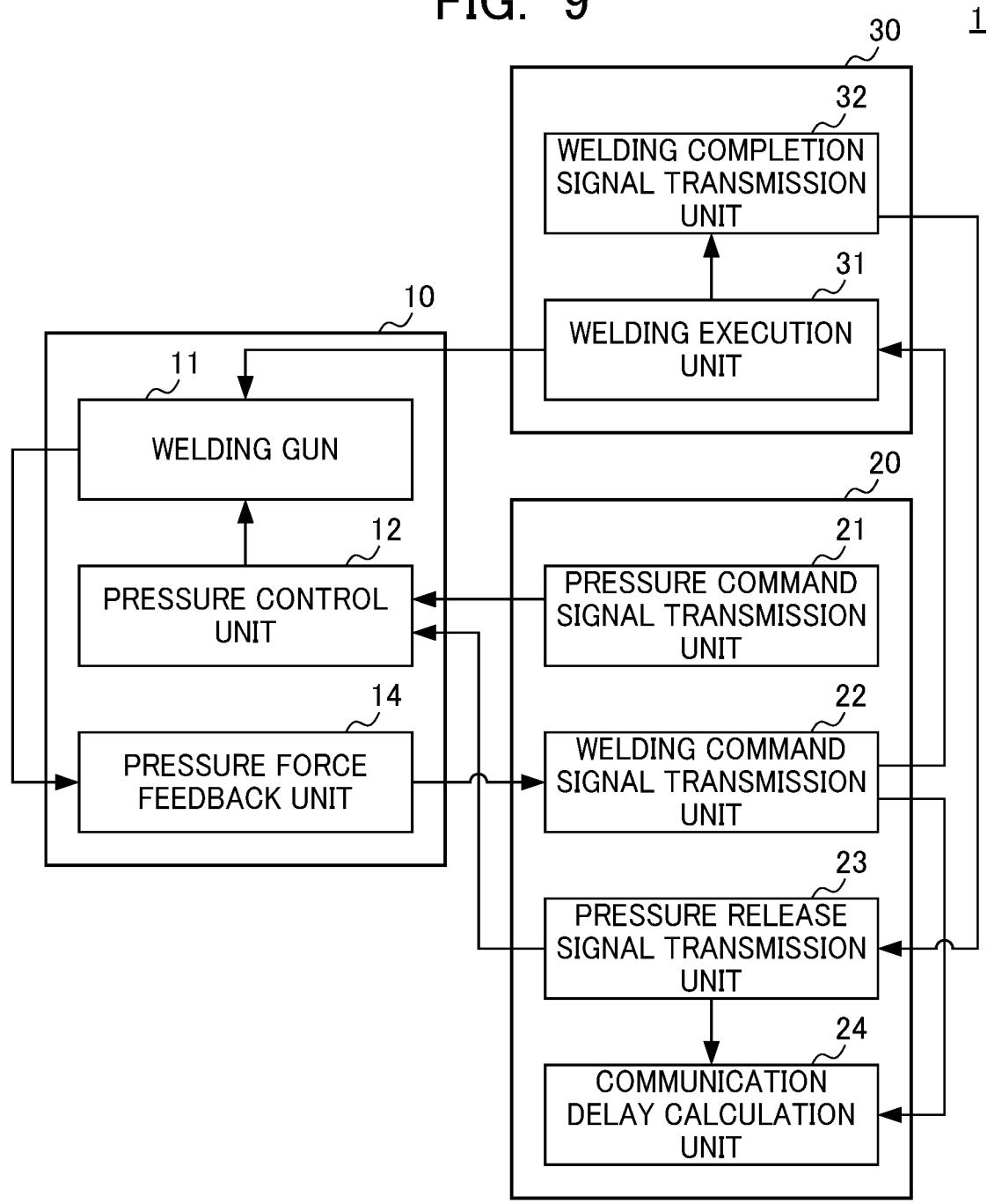
FIG. 9 is a diagram illustrating a functional configuration of the respective devices included in the spot welding system according to the second embodiment.

FIG. 9 is a diagram illustrating a functional configuration of the respective devices included in the spot welding system 1 according to the present embodiment in the second embodiment, a pressure force feedback unit 14 is substituted for the pressure completion signal transmission unit 13 of the spot welding robot 10 in the first embodiment. The function of the welding command signal transmission unit 22 of the robot controller 20 in the second embodiment is different from that in the first embodiment.

The pressure force feedback unit 14 measures the pressure force of the welding gun 11, and transmits it to the robot controller 20. When the pressure force notified of by the spot welding robot 10 reaches a predetermined value, the welding command signal transmission unit 22 transmits the welding command signal for making the welding machine 30 perform welding for a predetermined welding time.

According to the present embodiment, the robot controller 20 determines the completion of the pressuring upon reception of the pressure force feedback from the spot welding robot 10, and makes the welding machine 30 start to perform welding. As in the first embodiment, the spot welding system 1 according to the present embodiment measures the time between the transmission time of the welding command signal and the reception time of the welding completion signal, and subtracts a predetermined welding time from the measured time, thereby enabling to calculate the communication delay time between the robot controller 20 and the welding machine 30. Accordingly, the present embodiment is expected to produce the effects similar to those of the first embodiment.

It is noted that, in order to calculate the transmission time of the welding command signal by the above described method, the robot controller 20 may previously determine the pressure force rise time corresponding to a specified pressure force, or alternatively may obtain the time at which the pressure force reaches a specified value on the basis of the curve indicating the pressure force rising, by observing the value of the pressure force feedback.

[Third Embodiment]

The third embodiment of the present invention is described below. The present embodiment deals with the case in which the communication delay occurs not only in the communication path between the robot controller 20 and the welding machine 30 but also in the communication path between the robot controller 20 and the spot welding robot 10, and furthermore in which a delay time for releasing the pressure of the welding gun 11 is generated. Although the present embodiment has the same functional configuration as that of the first embodiment (FIG. 2), the welding command signal transmission unit 22 of the robot controller 20 and the welding completion signal transmission unit 32 of the welding machine 30 have different functions from those of the first embodiment, respectively.

The welding command signal transmission unit 22 further advances the transmission timing of the welding command signal by a known communication delay time in the communication between the spot welding robot 10 and the robot controller 20. The welding completion signal transmission unit 32 further advances the transmission timing of the welding completion signal by a known delay time in the releasing operation of the welding gun 11.

Figure 10:
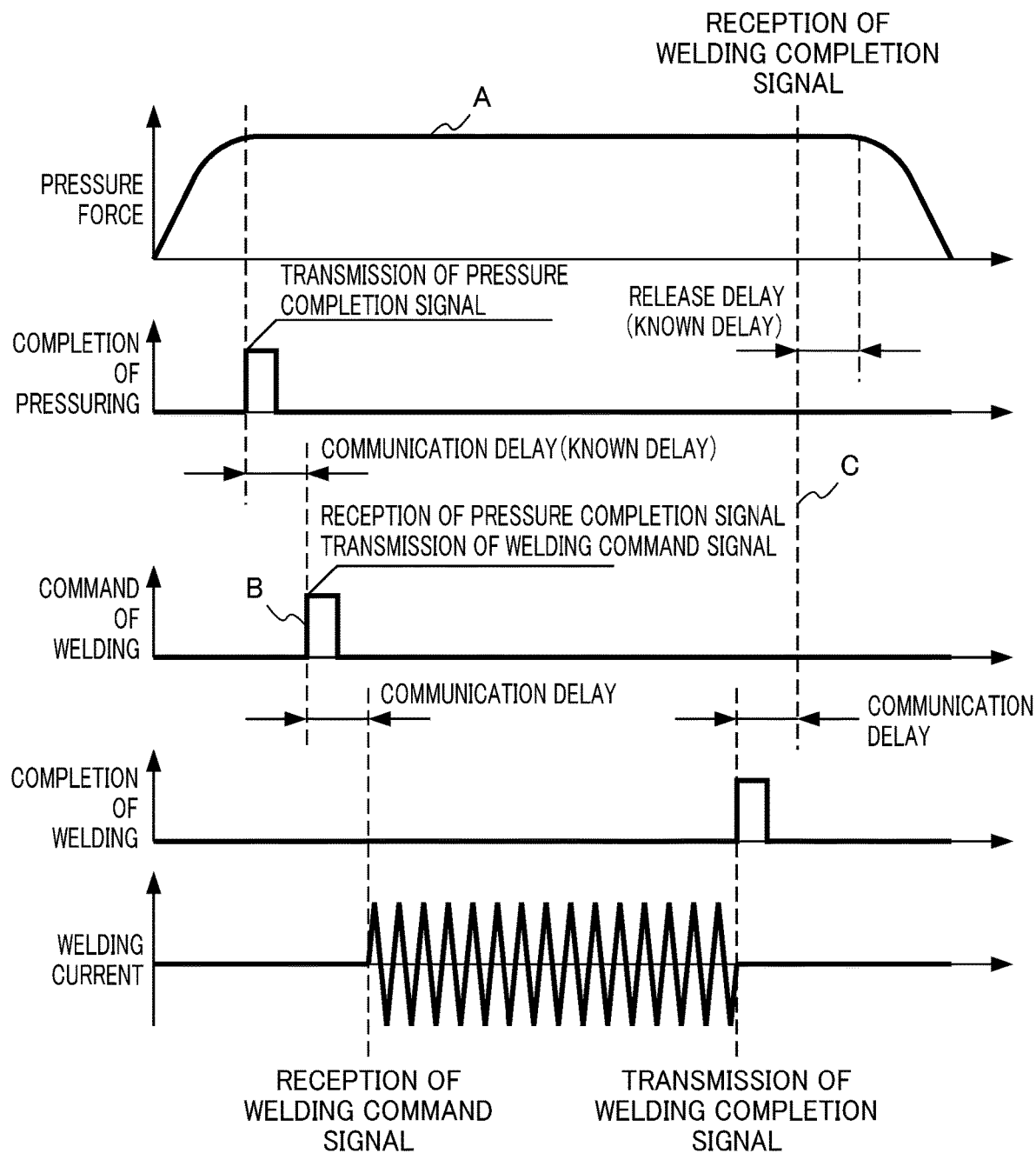
FIG. 10 is a diagram illustrating a relation among a pressure time, a welding time and various delay times in a spot welding process according to a third embodiment.

FIG. 10 is a diagram illustrating the relation among the pressure time, the welding time and various delay times in the spot welding process according to the present embodiment. In comparison with the timing chart (FIG. 3) in the first embodiment, the present timing chart additionally includes the known communication delay time when transmitting and receiving the pressure completion signal and the release delay time before the start, of releasing the pressure force of the welding gun 11. As a result, the start of the welding is further delayed, and the time during which the pressure force is maintained after the completion of the welding is further delayed, whereby the pressure time is prolonged. It is noted that the release delay time herein is a time including the communication delay of the pressure release signal and the delay of the operation itself of the welding gun 11.

FIG. 11 is a diagram illustrating a method of shortening the cycle time according to the present embodiment. According to the method of the present embodiment, the robot controller 20 calculates the communication delay time, and thereafter the transmission timing of the welding command signal and the welding completion signal are adjusted, by using the calculated communication delay time and the known communication delay time and the known release delay time.

Specifically, the welding command signal transmission unit 22 advances the transmission timing of the welding command signal ahead of the normal timing by the calculated communication delay time and the known communication delay time. Accordingly, the welding is started without delay after the rise of the pressure force. The welding completion signal transmission unit 32 advances the transmission timing of the welding completion signal ahead of the normal timing by the calculated communication delay time and the known release delay time. Accordingly, the pressure force of the welding gun 11 is released without delay after the completion of the welding. As a result, the pressure time becomes equivalent to the welding time, whereby the cycle time is shortened.

The known communication delay time herein is calculated by, for example, comparing the pressure force (reference sign A in FIG. 10) output by a pressure force measuring device provided in the spot welding robot 10 to an oscilloscope and the pressure completion signal (reference sign B in FIG. 10) output by the robot controller 20 to the oscilloscope. The known release delay time as calculated by, for example, comparing the pressure force (reference sign A in FIG. 10) output by the pressure force measuring device provided in the spot welding robot 10 to the oscilloscope and the welding completion signal or the pressure release signal (reference sign C in FIG. 10) output by the robot controller 20 to the oscilloscope.

According to the present embodiment, in the case where the known communication delay time is observed between the spot welding robot 10 and the robot controller 20, the spot welding system 1 further advances the transmission of the welding command signal by the delay time, thereby enabling to shorten the cycle time.

In the case where the known delay time observed before the releasing of the pressure force of the welding gun 11 starts, the spot welding system 1 further advances the transmission of the welding completion signal by the delay time, thereby enabling to shorten the cycle time.

[Fourth Embodiment]

The fourth embodiment of the present invention is described below. As in the third embodiment, the present embodiment deals with the case in which the communication delay occurs not only in the communication path between the robot controller 20 and the welding machine 30 but also in the communication path between the robot controller 20 and the spot welding robot 10, and furthermore in which the delay time for releasing the pressure of the welding gun 11 generated. Although the present embodiment has the same functional configuration as that of the second embodiment (FIG. 9), the welding command signal transmission unit 22 of the robot controller 20 and the welding completion signal transmission unit 32 of the welding machine 30 have different functions from those of the second embodiment, respectively.

As in the third embodiment, the welding command signal transmission unit 22 further advances the transmission timing of the welding command signal by the known communication delay time in the communication between the spot welding robot 10 and the robot controller 20. As in the third embodiment, the welding completion signal transmission unit 32 further advances the transmission timing of the welding completion signal by the known delay time in the releasing operation of the welding gun 11.

FIG. 12 is a diagram illustrating signal transmission and reception timing before the start of the welding according to the present embodiment. The robot controller 20 receives the pressure force feedback instead of the pressure completion signal illustrated in the timing chart (FIG. 10) in the third embodiment. The received feedback value is delayed by the known communication delay time, compared to the actual pressure force. The welding command signal is transmitted after the received feedback value rises, and the welding is started further after the communication delay occurs.

FIG. 13 is a diagram illustrating the signal transmission and reception timing before the start of the welding, in the case where the cycle time is shortened according to the present embodiment. According to the method of the present embodiment, as in the third embodiment, the robot controller 20 calculates the communication delay time, and thereafter the transmission timing of the welding command signal is adjusted, by using the calculated communication delay time and the known communication delay time.

Specifically, the welding command signal transmission unit 22 advances the transmission timing of the welding command signal ahead of the normal timing by the calculated communication delay time and the known communication delay time. Accordingly, the welding is started without delay after the rise of the pressure force. As in the third embodiment, the welding completion signal transmission unit 32 advances the transmission timing of the welding completion signal ahead of the normal timing by the calculated communication delay time and the known release delay time. Accordingly, the pressure force of the welding gun 11 is released without delay after the completion of the welding. As a result, the pressure time becomes equivalent to the welding time, whereby the cycle time is shortened.

The known communication delay time herein is calculated by, for example, comparing the pressure force (reference sign A in FIG. 12) output by the pressure force measuring device provided in the spot welding robot 10 to the oscilloscope and the pressure force feedback signal (reference sign D in FIG. 12) output by the robot controller 20 to the oscilloscope. As in the third embodiment, the known release delay time is calculated by, for example, comparing the pressure force (reference sign A in FIG. 10) output by the pressure force measuring device provided in the spot welding robot 10 to the oscilloscope and the welding completion signal or the pressure release signal (reference sign C in FIG. 10) output by the robot controller 20 to the oscilloscope.

According to the present embodiment, as in the second embodiment, the robot controller 20 determines the completion of the pressuring upon reception of the pressure force feedback from the spot welding robot 10, and makes the welding machine 30 start to perform welding. The spot welding system 1 according to the present embodiment advances the transmission of the welding command signal by the calculated communication delay time and the observed and known communication delay time, and further advances the transmission of the welding completion signal by the calculated communication delay time and the observed and known release delay time, thereby enabling to shorten the cycle time. As a result, the effects similar to those in the third embodiment are expected.

Although the embodiments of the present invention have been described so far, the present invention is not limited to the above-described embodiments. The effects described in the present embodiments are listed merely as the most preferable effects produced by the present invention. The effects produced by the present invention are not limited to those described in the present embodiments.

The method of controlling the spot welding by the spot welding system 1 is realized by software. In the case where the method is realized by software, programs included in the software are installed in a computer. The programs may be stored in a removable medium and distributed to a user, or may be downloaded and distributed to a user's computer via a network.

EXPLANATION OF REFERENCE NUMERALS

1 SPOT WELDING SYSTEM
10 SPOT WELDING ROBOT
11 WELDING GUN
12 PRESSURE CONTROL UNIT
13 PRESSURE COMPLETION SIGNAL TRANSMISSION UNIT
14 PRESSURE FORCE FEEDBACK UNIT
20 ROBOT CONTROLLER
21 PRESSURE COMMAND SIGNAL TRANSMISSION UNIT
22 WELDING COMMAND SIGNAL TRANSMISSION UNIT
23 PRESSURE RELEASE SIGNAL TRANSMISSION UNIT
24 COMMUNICATION DELAY CALCULATION UNIT
30 WELDING MACHINE
31 WELDING EXECUTION UNIT
32 WELDING COMPLETION SIGNAL TRANSMISSION UNIT

What is claimed is:

1. A spot welding system comprising a spot welding robot, a robot controller and a welding machine,
the spot welding robot comprising:
a memory configured to store a program: and
a processor configured to execute the program and control the spot welding robot to:
apply pressure to a welding gun upon reception of a pressure command signal from the robot controller, and release the welding gun upon reception of a pressure release signal; and
transmit a pressure completion signal to the robot controller upon reaching of a pressure force to a predetermined value,
the robot controller comprising:
a memory configured to store a program: and
a processor configured to execute the program and control the robot controller to:
transmit the pressure command signal to the spot welding robot;
transmit a welding command signal for making the welding machine perform welding for a predetermined welding time upon reception of the pressure completion signal from the spot welding robot;
transmit the pressure release signal to the spot welding robot upon reception of a welding completion signal from the welding machine; and
calculate a half of a time obtained by subtracting the welding time from a differential time between the transmitting of the welding command signal and the reception of the welding completion signal, as a communication delay time between the robot controller and the welding machine,
the welding machine comprising:
a memory configured to store a program: and
a processor configured to execute the program and control the welding machine to:
start the welding by supplying a welding current upon reception of the welding command signal from the robot controller; and
transmit the welding completion signal to the robot controller upon completion of the welding for the welding time, wherein
when the communication delay time is calculated,
the welding command signal is transmitted when a time obtained by subtracting the communication delay time from a pressure force rise time corresponding to the pressure command signal elapses after the transmitting of the pressure command signal, and
the welding completion signal is transmitted when a time obtained by subtracting the communication delay time from the welding time elapses after the starting of the welding.

2. The spot welding system according to claim 1, wherein transmission timing of the welding command signal is further advanced by a known delay time in communication between the spot welding robot and the robot controller.

3. The spot welding system according to claim 1, wherein transmission timing of the welding completion signal is further advanced by a known delay time in a releasing operation of the welding gun.

4. The spot welding system according to claim 1, wherein the robot controller shares the communication delay time calculated with another spot welding system.

5. A spot welding system comprising a spot welding robot, a robot controller and a welding machine, the spot welding robot comprising:
- a memory configured to store a program: and
- a processor configured to execute the program and control the spot welding robot to:
    - apply pressure to a welding gun upon reception of a pressure command signal from the robot controller, and release the welding gun upon reception of a pressure release signal; and
    - measure a pressure force and notifying the robot controller of the pressure force, the robot controller comprising:
- a memory configured to store a program: and
- a processor configured to execute the program and control the robot controller to:
    - transmit the pressure command signal to the spot welding robot;
    - transmit a welding command signal for making the welding machine perform welding for a predetermined welding time upon reaching of the pressure force to a predetermined value, the pressure force being notified of by the spot welding robot;
    - transmit the pressure release signal to the spot welding robot upon reception of a welding completion signal from the welding machine; and
    - calculate a half of a time obtained by subtracting the welding time from a differential time between the transmitting of the welding command signal and the reception of the welding completion signal, as a communication delay time between the robot controller and the welding machine, the welding machine comprising:
- a memory configured to store a program: and
- a processor configured to execute the program and control the welding machine to:
    - start the welding by supplying a welding current upon reception of the welding command signal from the robot controller; and
    - transmit the welding completion signal to the robot controller upon completion of the welding for the welding time, wherein when the communication delay time is calculated,
- the welding command signal is transmitted when a time obtained by subtracting the communication delay time from a pressure force rise time corresponding to the pressure command signal elapses after the transmitting of the pressure command signal, and
- the welding completion signal is transmitted when a time obtained by subtracting the communication delay time from the welding time elapses after the starting of the welding.

6. The spot welding system according to claim 5, wherein transmission timing of the welding command signal is further advanced by a known delay time in communication between the spot welding robot and the robot controller.

7. The spot welding system according to claim 5, wherein transmission timing of the welding completion signal is further advanced by a known delay time in a releasing operation of the welding gun.

8. The spot welding system according to claim 5, wherein the robot controller shares the communication delay time calculated with another spot welding system.

* * * * *